Sept. 20, 1971  C. P. CANBY  3,605,765

INTERPROXIMAL DENTAL STIMULATOR

Filed Oct. 16, 1969

INVENTOR

CLARENCE P. CANBY

BY *Millard F. Hodges*

ATTORNEY

United States Patent Office 3,605,765
Patented Sept. 20, 1971

3,605,765
INTERPROXIMAL DENTAL STIMULATOR
Clarence P. Canby, 122 Medford Drive,
San Antonio, Tex. 78209
Filed Oct. 16, 1969, Ser. No. 866,975
Int. Cl. A61c *15/00*
U.S. Cl. 132—93                                6 Claims

ABSTRACT OF THE DISCLOSURE

A pick type, interproximal dental stimulator having a wood exterior surface bonded to and surrounding a fiber filament core the size, external contour, flexibility and resulting tensile strength particularly adapting the instrument to removing dental plaque stimulating gingival tissue and promoting oral health.

---

Problems have faced men throughout history in combating caries, deterioration of the gingival tissues resulting in the absorption of bone and eventual loss of the teeth.

One object of this invention was to provide an effective interproximal self care dental hygienic instrument for promoting oral health.

Another object was to provide an instrument possessing sufficient abrasive surface to break down the dental plaque permitting penetration of saliva into the mass of tenacious material.

Another object was to provide an instrument of such a size, range of dimensions and contours as to effectively remove impacted food debris and extra cellular bacteria products from persons of all ages having teeth of various interproximal spaces and malposed teeth.

Another object was to provide an instrument of sufficient flexibility and tensile strength to remove objectionable matter from between the molars avoiding the breaking of the tip of the instrument leaving it between the molars causing discomfort, irritation and at times early professional attention.

Research and study of current professional literature in conjunction with many years of professional experience and observation by your inventor leads to the design of an instrument having an outer configuration similar to the flat toothpick. Dimensions of the average mouth leads to a desired length of approximately three (3) inches. The dimensions of the finished product should have a fine point with a cross section dimension of point two (.2) mm. by one (1) mm. and a broad point having a cross section of point five (.5) mm. by one point five (1.5) mm. The instrument should be produced and packaged and arranged in sizes to the largest size having a fine point of one (1) mm. by two (2) mm. and a broad point one point five (1.5) mm. by three (3) mm. Broad point of the instrument may be constructed in a slightly curved, dished or spoonlike configuration to facilitate removal of objectionable residue from concave interproximal surfaces of teeth.

The instrument is fabricated by securely bonding wood of selected quality to a fiber filament central core or section. The points and edges should preferably be of a smooth rounded contour.

For a detailed description of the construction and use, reference is made to the attached drawings wherein like reference numerals refer to identical or equivalent components throughout the several views and in the detailed description.

Figure 1:
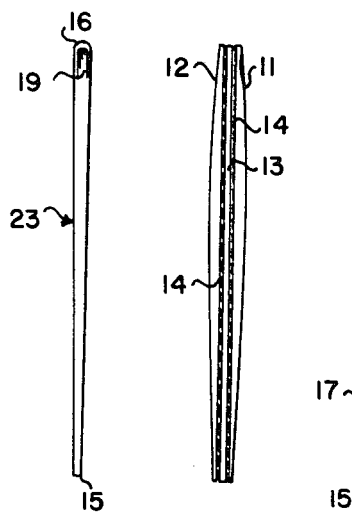
FIG. 1 is a series of elevation views partially exploded and fragmented illustrating the construction and configuration of the instrument of this invention.

For an illustration of a preferred embodiment of the invention, reference is made to FIG. 1. The instrument may be constructed with a concave section 11 and a smooth section 12 of suitable wood such as birch or wood of softer texture if desired, with a central fibrous filament 13 such as rayon, nylon or other fibers of high tensile strength as well as fiber glass. The fibers are securely bonded to the wood by suitable bonding means 14 such as epoxy resins, as well as thermosetting plastic bonding materials. The exterior finish of the completed instrument should have a blunt fine point 15 with the broad point 16. All edges 17 should be of a smooth arcuate contour to avoid undue irritation of the gingival gum tissue 18.

Referring again to FIG. 1 the broad point 16 should preferably have formed in the concave section 11 a dished detent 19. Such a curved like contour or detent is desirable for cleaning the frequently concave interproximal area 20, FIGS. 4, 5 and 6 of teeth 21. This detent 19 may be formed by removing a portion of the wood from the concave section 11 or formed by pressure.

Figure 2:
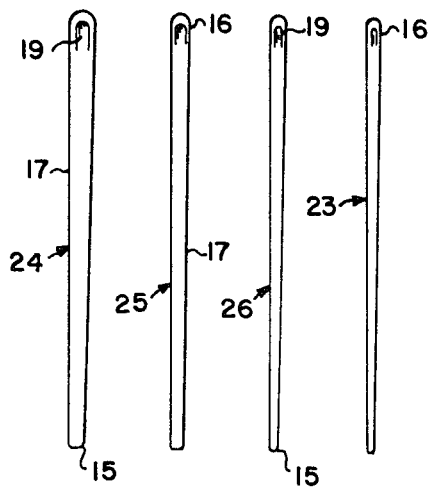
FIG. 2 is a series of elevation views illustrating a preferred range of sectional dimensions.

As previously referred to, this instrument should preferably be produced in a range of sizes for cleaning, scarifying and disrupting dental plaque deposits for all age groups possessing various spacing of teeth 21 and varying gum 18 conditions. Referring to FIG. 2, the instrument should be approximately three (3) inches in length. The suggested dimensions for the preferred embodiment of the finest instrument 23 has a fine point 15 with a cross section of point two (.2) mm. by one (1) mm. This finest instrument preferably would have a broad point 16 with a cross section of point five (.5) mm. by one point five (1.5) mm. The largest instrument 24 would have a fine point 15 cross section of one (1) mm. by two (2) mm. with a broad point 16 of one point five (1.5) mm. by three (3) mm.

A preferred embodiment, FIG. 2, would suggest a medium instrument 25 and a small instrument 26 having a cross sectional dimension proportionally interspaced between the finest 23 and the largest instrument 24.

Figure 3:
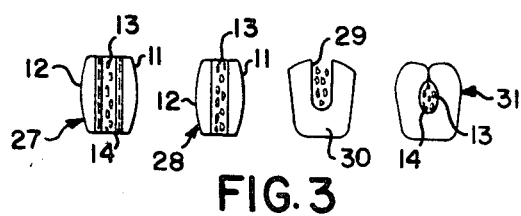
FIG. 3 is a series of sectional views illustrating the preferred and alternative method of construction.

A sectional view of FIG. 3 illustrates two methods of construction. The preferred method is illustrated at 27 with an exploded view and at 28 illustrating the completed sealed, bonded product. An alternative method of construction may be accomplished by forming a groove 29 in a unitary section of wood 30 placing the fiber filaments 13 and the bonding means 14 in the groove 29 and sealing the combined structure 31.

Figure 4:
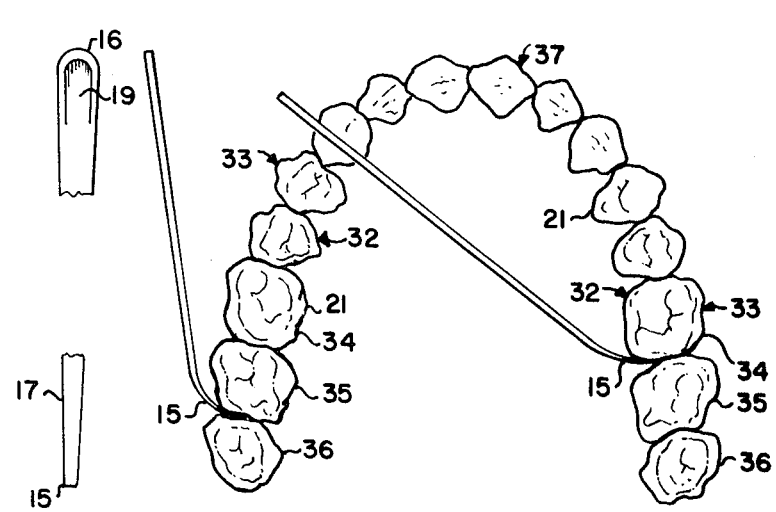
FIG. 4 is a schematic view illustrating the use of the instrument cleaning the interproximal molar area.
Figure 5:
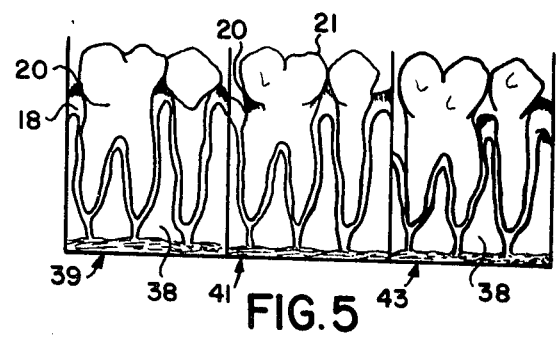
FIGS. 5 and 6 are elevation views partially in section illustrating teeth, gum and bone structure and progressive pathology of gingival disorders.
Figure 6:
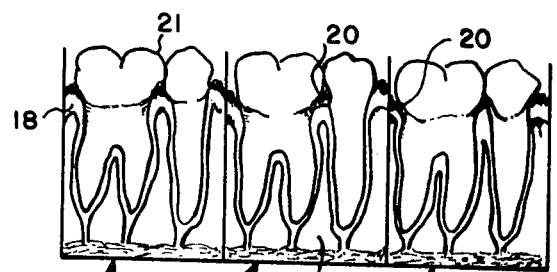

The utilization of the instrument and some of the suggested results of use or lack of use is illustrated in FIGS. 4, 5 and 6. The flexibility of the instrument and the increased length over the conventional toothpick permits a curving of the fine 15 and broad point 16 to effectively clean interproximal area 20 of the lingual 32 areas as well as the buccal areas 33 of the first 34, second 35 and third 36 molars. The effective cleaning of the labial area 37 though somewhat less difficult for the average user is facilitated by providing the finest instrument 23. The effective cleaning and scarifying of the dental plaque in the interproximal 20 areas of the teeth 21 assists in delaying or preventing gingival disorders and progressive deterioration of the gum 18 tissue, an absorption of the bone structure 38 and retards progressive decline of oral health illustrated in FIGS. 5 and 6. A relative pathology is illustrated at 39 and 40 with the progressive decline at 41, 42, 43 and 44. Effective use of the instrument of this invention will remove compacted food deposits, disperse acid forming deposits, break up plaque formations, retard decalcification of the caries process in the interproximal 20 surfaces of the teeth 21 and generally assist in promoting oral health if utilized in conjunction with other professionally approved good dental practices.

As was referred to in the last stated object of the invention and in the description of the method of construction of the improved interproximal dental stimulator; the flexible high tensile strength fibers 13 are firmly bonded 14 to the wood sections 11, 12 and 30 with a purpose of retaining high tensile strength in the instrument even though the wood structure 11, 12 or 30 is fractured or broken. This functional quality of the composite structure accomplishes the latter stated object of preventing the breaking of the tip 15 or 16 and lodging a portion of the wood structure 11, 12 or 30 between the teeth 21.

Having described in detail the construction of my improved interproximal dental stimulator with two methods of construction it will be apparent to those skilled in the art that numerous changes may be made in the detailed structure described without departing from the spirit and principle of the invention is defined by the appended claims.

I claim:

1. An improved interproximal dental stimulator comprising:
    (a) a slender elongated wood exterior member having at least one longitudinal discontinuity, said member comprising:
    (b) a substantially rectangular blunt fine point at a first end,
    (c) a broad point having an oval exterior configuration, said broad point being of a substantially rectangular cross section at a second end,
    (d) a high tensile strength flexible fibrous filament encased in said wood exterior member, and
    (e) a bonding means securing said wood exterior member and the said fibrous filaments in a unitary flexible structure possessing high tensile strength.

2. The invention of claim 1 wherein the said wood exterior member comprises:
    (a) a first wood exterior section including a said fine point and a said broad point,
    (b) a second wood exterior section including a said fine point and a said broad point,
    (c) said first wood exterior section and said second wood exterior section being positioned in parallel contact encasing said fibrous filament and said bonding means, said bonding means securing the said wood exterior sections and said fibrous filament in the said unitary flexible structure.

3. The invention of claim 1 wherein the said wood exterior member includes a substantially concave dished detent closely adjacent the said broad point.

4. The invention of claim 2 wherein at least one of the said exterior sections includes a concave dish detent closely adjacent said broad point.

5. The invention of claim 1 wherein the overall length of said unitary structure is not less than two point five (2.5) inches and not more than three point five (3.5) inches.

6. The invention of claim 1 wherein the unitary structure comprises:
    (a) an elongated body portion of approximaetly three inches in length,
    (b) a fine point possessing dimensions in a range from point two (.2) mm. by one (1) mm. to one (1) mm. by two (2) mm., and
    (c) a broad point possessing dimensions in a range from point five (.5) mm. by one point five (1.5) mm. to one point five (1.5) mm. by three (3) mm.

References Cited

UNITED STATES PATENTS

| | | | |
|---|---|---|---|
| 407,362 | 7/1889 | Mason | 132—89 |
| 1,575,317 | 3/1926 | Carmichael | 132—93 |
| 1,969,874 | 8/1934 | Butterfield | 132—93X |
| 1,997,877 | 4/1935 | Spanel | 132—89 |
| 2,527,857 | 10/1950 | Strachan | 132—93 |

LOUIS G. MANCENE, Primary Examiner

J. N. ESKOVITZ, Assistant Examiner